Aug. 27, 1940.    H. VAN DYKE ET AL    2,212,722
GRAIN CLEANER
Filed May 20, 1936    2 Sheets-Sheet 1

HENRY VAN DYKE
HAROLD J. VAN DYKE
INVENTOR

ATTORNEY

Aug. 27, 1940.   H. VAN DYKE ET AL   2,212,722
GRAIN CLEANER
Filed May 20, 1936.   2 Sheets-Sheet 2

HENRY VAN DYKE
HAROLD J. VAN DYKE
INVENTORS

ATTORNEY

Patented Aug. 27, 1940

2,212,722

UNITED STATES PATENT OFFICE 2,212,722

GRAIN CLEANER

Henry Van Dyke and Harold J. Van Dyke, Forest Grove, Oreg.

Application May 20, 1936, Serial No. 80,749

1 Claim. (Cl. 209—114)

Our invention relates to grain cleaning, grain separating and grain classifying machines.

The invention is comprised of a plurality of power driven endless conveying belts arranged in juxtaposition with each other and in spaced relation with each other and at the same or at different inclinations to the horizontal. Elevators are provided for feeding material to the various and/or selected ones of the conveyors and for receiving the separated classified and cleaned materials, at a plurality of positions.

In order to adapt our device to the various varieties of grain to be separated and classified we provide means for driving the conveyors at different speeds, for tilting the endless conveyors for effecting the separation and classifying at different angles and for delivering the product to be classified at different positions upon the conveying and classifying belts.

The primary purpose and object of our invention is to provide a relatively inexpensive device for the classifying, separating and cleaning grain and to collect the grain of similar class at different collecting stations.

A further object of our invention consists in so constructing the device that it will be comprised of few parts, and be simple of construction, one that may be easily maintained in operation with practical freedom from operating annoyances and for maintaining the conveying and classifying belts in alignment and taut relative to the rolls about which the same are to be trained.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings.

Like reference characters refer to like parts throughout the several views.

Figure 1:
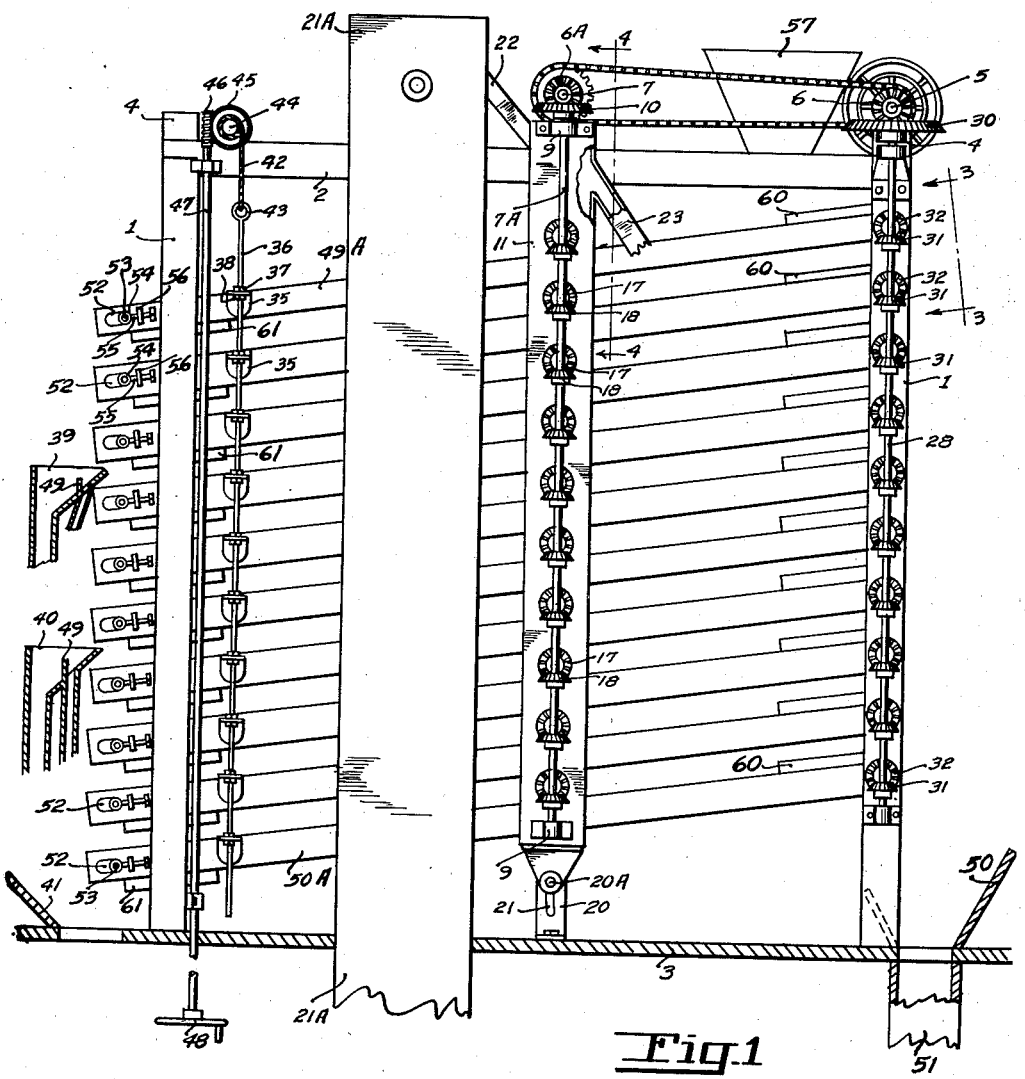
Fig. 1 is a side view of the assembled device.

Our device is comprised of a frame made up of a plurality of posts 1 secured together at their top by side top plates 2; at their bottom by sills 3 and by suitable cross connecting frame members 4. Power for operating the device is delivered to a drive shaft 5.

It has been found desirable in devices of this kind to adapt the same for cleaning feed of different varieties to drive the same at different speeds and it is therefore necessary that provision be made for rotating the drive shaft at different speeds. This may be accomplished by placing pulleys of different diameters upon the shaft 5 or by providing means for driving the shaft at different speeds, as through the use of a rheostat in connection with an electric motor for driving the same.

A driving gear 6 is disposed upon the drive shaft 5 and a shaft 7 is disposed upon the outside of the frame and the shaft 7 is journaled in suitable bearings 8. A driving pinion 10 is disposed upon the upper end of the shaft 7A and the same coacts with and is driven by the driving gear 6A. The shaft 7A is supported and secured to the outside of the feed hopper 11

Feeding tubes 12 run transversely of the frame and are supported therein. One end of the feeding tube 12 communicates with the interior of the feeding hopper and feeding tube 12 communicates with an overflow chute 13. The feeding and conveying tube 12 has an auger 14 running transversely thereof and the auger 14 runs across the feeding hopper 11 and picks up material and delivers the same into and conveys the same longitudinally of the conveying and distributing tube 12.

A plurality of discharge spaced outlets 15 are placed within the underside of the wall of the tube. To determine the amount of material that may be fed through the outlets 15 we provide movable bands 16 upon the tubes and adjacent the slits. The bands may be moved longitudinally of the tube and made to cover whatever portion of the slit 15 as is found desirable to restrict the flow of grain to be cleaned and classified. A bevel gear is disposed on the outside end of each of the auger shafts and the same is driven by a coacting bevel gear 18 that is disposed upon the shaft 7A.

It may be found desirable to adjust the feeding and conveying tubes 12 vertically and if this is done it is also necessary to adjust the bevel gears 18 longitudinally of the shaft 7A. This is accomplished by placing set screws 19 in the hubs of each of the bevel gears 18 to permit the placement of the game in desired position and in fixed position longitudinally of the shaft 7A.

The feeding hopper 11 is supported upon any suitable bracket support 20 and an arcuate slot 21 is disposed within the bracket to facilitate the adjustment of the hopper assembly. In the event that the same is raised and lowered, or in the event that the gearing disposed upon the shaft 7A is adjusted for any reason the same is positioned by a pin 20A engaging in the arcuate slot 21.

An elevator 21A is provided and the same delivers material into the feeding hopper 11 through a chute 22 that leads from the elevator 21A directly into the top of the feeding hopper 11.

To make the machine operate to capacity at all times it is necessary that feeding hopper 11 be maintained substantially full. To prevent clogging an overflow discharge chute 23 is provided that conveys the overflow material back to the source of supply from where the elevator 21 receives the grain to be cleaned and classified. Any material delivered into the overflow chute 23 will gravitate back into the feed hopper where the elevator 21A receives its source of supply.

A plurality of endless conveying belts 24 are trained about driven drums 25 and idler drums 26. The belts are so made as to prevent the falling of the grain therethrough. The material to be separated and cleaned and classified is fed directly upon the top side of the endless conveyor belts. Each of these belts is driven from a common source of power. The driving shaft 5 is mounted transversely of the frame and at the top of the same and a driven shaft 28 extends vertically on the outside of the frame and is secured to the end post 1. A driving gear is mounted upon the shaft 5 and a coacting gear 30 is mounted on the top end of the shaft 28 and as the shaft 5 is rotated the shaft 28 will also be rotated. A plurality of spaced gears 31 is mounted upon the shaft 28 and companion gears 32 are mounted upon the driving shafts 33 to which the driving drums 25 are attached. These conveying, classifying and cleaning belts are inclined to the horizontal and are spaced one above the other. One end of each of the frames in which the belt, the driving drum and the idler drums work are supported upon a pair of brackets 35 that are disposed upon the opposite side frames in which the driving, classifying and cleaning belts are disposed. The supporting shaft 36 is a threaded shaft for practically its full length and locking nuts 37 and 38 are disposed at each side of the ear of the bracket 35 through which the threaded shaft passes. When the desired angle or tilt is determined for the frame the locking nuts 37 and 38 are tightened upon the shaft 36.

The classifying and cleaning are accomplished by the material being deposited upon the classifying, cleaning and conveying belts. For example, if vetch is being separated from wheat the vetch has a greater tendency to roll down the belt in the opposite direction from which the surface of the belt travels. The round vetch will be first to roll from the classifying, cleaning and conveying belt. The control of the surface speed of the belt is also essential to proper classifying. We place a receiving hopper 39 at the lower discharge end of the classifying belt or belts, only one of such hoppers being shown and into this hopper the material having the greatest tendency to roll down the belt will be the first to be received into the receiving hopper 39. We place therebelow another hopper 40 and the vetch having a less tendency to roll will pass down and be received into the hopper 40. The number of receiving hoppers is determined by the class and kind of the separation that is to be effected. The top frame 41 has the least inclination to the horizontal and the inclination of the classifying, cleaning and conveying belt disposed therebelow increases in inclination from the top downward.

The last to roll from the conveying, classifying and cleaning belts drops into a hopper 41. Chutes connect the respective hoppers with receiving bins, not here shown.

The movable end of the entire frame assembly in which the conveying, classifying and cleaning belts are disposed and operate, are supported about any suitable cable 42 that is secured to an eye 43 that is placed in the upper end of the threaded bolts 36. The cables are trained about a winding drum 44. The drum 44 has a worm wheel 46 mounted upon a shaft 47 and a hand wheel 48 is disposed thereupon to facilitate the rotation of the winding drum 44 and to raise and lower the frame assembly.

In the material rolling down the conveying and classifying belt or belts the trajectory of the one having the greatest tendency to roll will be the greatest and the one having the least tendency to roll will drop off of the belt or belts at the point of their reverse of direction of rotation.

To further classify the material we place a stop 49 in each of the receiving hoppers 39 and 40 and provide discharge spouts at either side of the stop 49 to thereby pass the classified material into separate and distinct bins. The material that rides the classifying and conveying belts due to its shape or structure is delivered from the upper end of the classifying and transfer belts and drops directly into a receiving hopper 50 that is disposed at the forward end of the machine. The material deposited in the bin 50 gravitates therefrom through discharge spouts 51 into waste receiving receptacles disposed therebelow and not here shown.

To maintain the conveying and classifying belts suitably taut and sufficiently stretched and tight we provide slots 52 at the lower end of each of the side frames that form the frame in which the conveying and classifying belts rotate. The idler drum about which these belts rotate have a shaft 53 outwardly extending therefrom that rotates within a bearing block 54 that is mounted upon an adjusting screw 55. The adjusting screw 55 is threaded and passes through a bracket 56 that is secured to the outside of each of the side frames in which the conveying and classifying belt is driven. The shaft 53 moves within the slot 52. The adjusting of the screw within the bracket 56 loosens or tightens the conveying or classifying belt depending upon which direction the same is moved.

Figure 2:
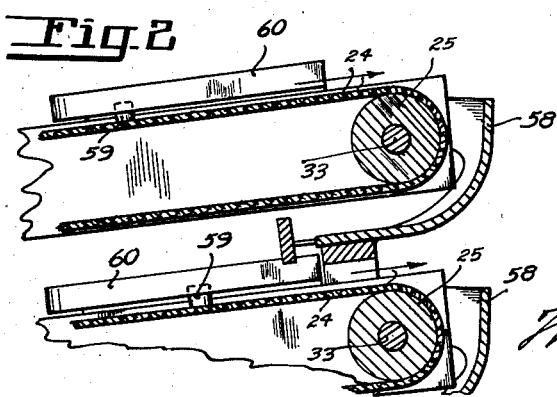
Fig. 2 is a fragmentary sectional side view of the conveying rollers and of a boot associated therewith. This view is taken on line 2—2 of Fig. 3, looking in the direction indicated.
Figure 3:
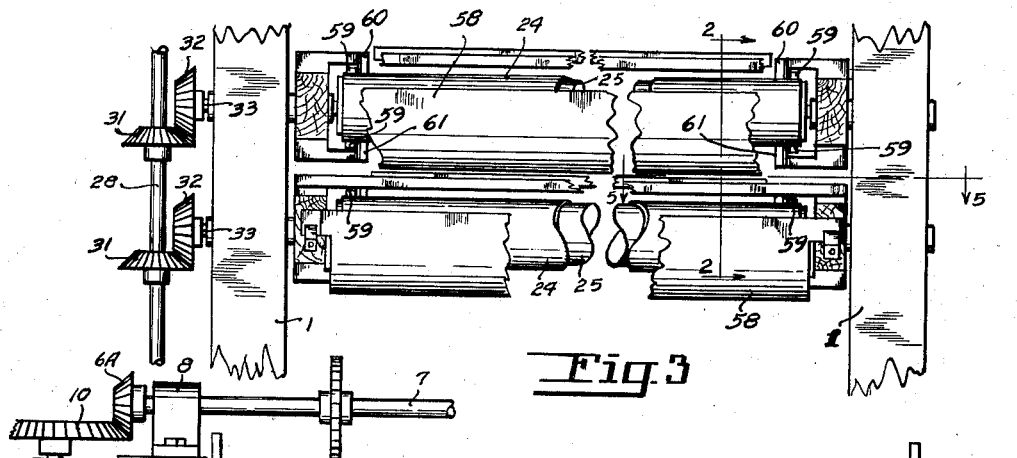
Fig. 3 is a fragmentary sectional side view of the belt conveying drums or rollers, and of the power take-off for driving the same and of the frame for supporting the same.
Figure 4:
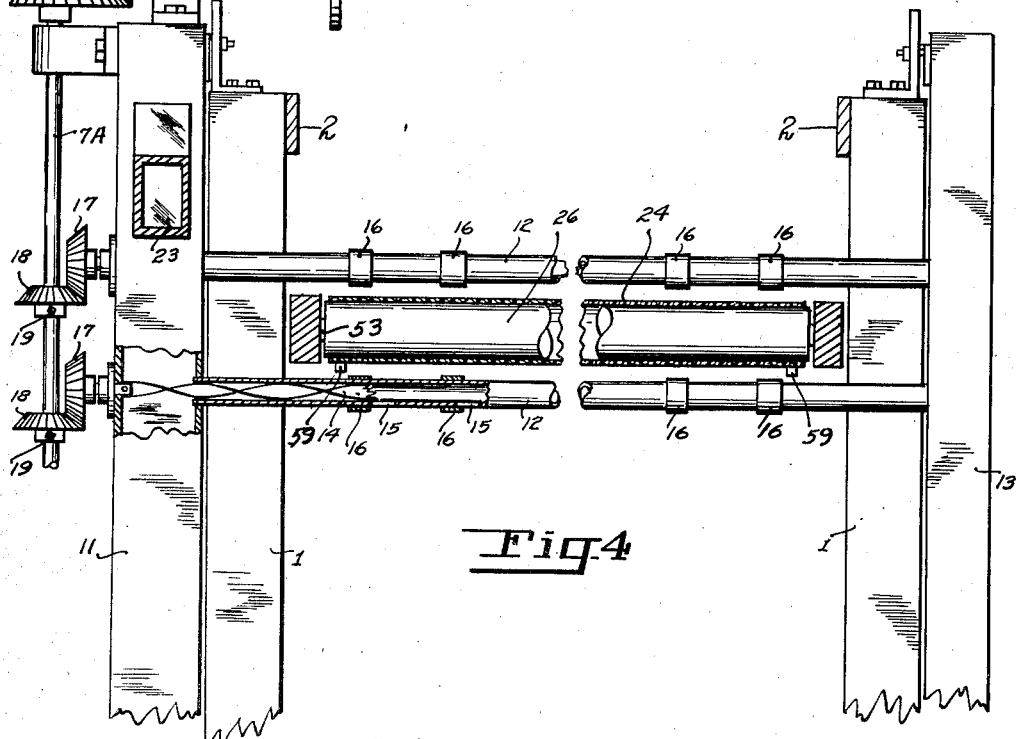
Fig. 4 is a fragmentary sectional side view of the conveying augers utilized for the delivering of the material to be classified for the central source of supply upon the classifying belts. This view is taken on line 4—4 of Fig. 1, looking in the direction indicated.
Figure 5:
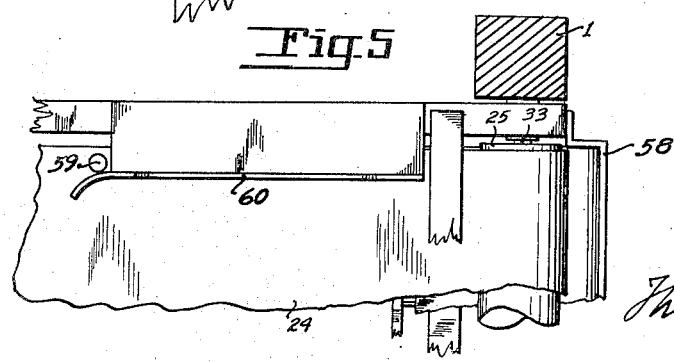
Fig. 5 is a fragmentary plan view of one of the endless conveying and classifying belts. This view is made to illustrate means for maintaining the conveying and classifying belts in desired position upon the drums or rollers for driving the same.

The machine thus far described is particularly adapted for the classifying and cleaning of the larger grains, such as wheat, oats, rye, beans, peas, rice and the like.

Where the smaller grains are to be cleaned and classified, such as clover, cabbage, radish, mustard seeds and other of the smaller seeds the material to be cleaned and classified are delivered into a hopper 57 and the feeding hopper 11 is emptied and the drives secured thereto are rendered inoperative. Finally the shield boots 58, illustrated in Fig. 2, are positioned and the smaller seeds are delivered as a sheet from the hopper 57 directly upon the top one of the classifying and conveying belts 24. The round seeds or the ones having the greatest tendency to roll, roll down the top one of the classifying or conveying belt. The top one of the belts is inclined the least to the horizontal and the largest and most perfect ones of the seeds to be classified roll down the top belt. Those remaining, including the dross material, will be carried upward along the belt and be deposited into the boot or shield 58 and will again be distrbuted on the next conveying and classifying belt disposed therebelow and this process will continue until the dross material will traverse all of the conveying and classifying belts and finally be delivered into the dross receiving hopper 50. The classified materials will gravitate to the classifying and conveying belt, into the bin or bins for receiving the same and be delivered into suitable collecting and storage bins, through the hoppers 39, 40 and 41, here shown as three in number, but we do not wish to be limited to three as the number would be determined by the classification that is to be made into the fineness with which the classifying and cleaning is to be perfected.

Heretofore, one of the problems in devices of this kind is to make the conveying and classifying belts run true to alignment when moving longitudinally of the driving drums and the idler drum disposed within the respective frames. To prevent this end movement we provide a plurality of spaced aligning buttons 59 at either side of the conveying and classifying belts. The spaced buttons outwardly extend from the face of the belt. Near the upper end of the top side of the frame we place a shield 60 at each side of the upper end of each of the side frame members and against this shield the outwardly extending buttons 59 engage to prevent the conveying and classifying belt from moving longitudinally of the driving drum and thus prevent the belt from becoming out of alignment with the tops. We also place a second shield 61 against which the said buttons are also made to engage to thereby provide at either end and at each side of the frame aligning shields for maintaining the driving and classifying belts in position and alignment upon the respective driving and driven drums.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claim which follows.

What we claim is:

A grain sorter comprising a plurality of stacks of frames having power driven endless belts therein, said frames being inclined to the horizontal with the higher ends pivotally supported, a single vertically adjustable threaded shaft connected at spaced points to the lower ends of the frames, the connection between the shaft and each frame being independent and including a clip on each frame through which the threaded shaft passes and nuts threaded on the shaft for adjusting the clips whereby the relative inclinations of adjacent frames may be varied.

HENRY VAN DYKE.
HAROLD J. VAN DYKE.